United States Patent Office 3,242,137
Patented Mar. 22, 1966

3,242,137
POLYMERS OF EPOXY ALIPHATIC KETONES
Thomas W. Findley, La Grange, Ill., assignor to Swift & Company, Chicago, Ill., a corporation of Illinois
No Drawing. Filed Oct. 26, 1959, Ser. No. 848,500
4 Claims. (Cl. 260—63)

This is a continuation-in-part of appplication Serial No. 589,342, filed June 4, 1956, now abandoned.

This invention in general relates to new compositions of matter and more particularly to epoxy aliphatic ketones wherein at least one of the radicals thereof is a long chain aliphatic group having an oxirane group and polymers made therefrom.

The compositions of this invention have the general formula:

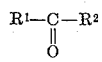

wherein $R^1$ is an aliphatic group having 10–21 carbons and at least one epoxy group, and $R^2$ is an aliphatic group having between 1 and 21 carbons or an aliphatic group having 10–21 carbons and at least one epoxy group. The R groups ($R^1$ and $R^2$) are preferably derived from fatty acids and for the most part represent fatty hydrocarbon radicals.

The epoxy aliphatic group may be monoepoxy heptadecyl or polyepoxy heptadecyl, monoepoxy pentadecyl, monoepoxy or diepoxy heptadecenyl, monoepoxy heptadecadienyl, monoepoxy decyl, monoepoxy undecyl, monoepoxy tridecyl, monoepoxy nonadecyl, monoepoxy eicosyl, etc. The ketones having one epoxy group per molecule may be used as corrosion inhibitors in lubricating oils. The epoxy aliphatic ketones of this invention may be polymerized. Polymerization of the monomer is accomplished by heating the aliphatic ketone in the presence of a small amount of $BF_3$-etherate complex to form a polyether, either linear or cross-linked. The linear polymer is best prepared by polymerizing ketones having about one or slightly more epoxy group per molecule or by adding only sufficient catalyst to polymerize only one epoxy group in a polyepoxy ketone; the cross-linked polymer from ketones having an average of substantially more than one epoxy group per molecule. The cross-linked polymer is a resin which does not melt and is insoluble in organic solvents or aqueous solutions such as alkali.

One embodiment of the polyether group of the linear type polymer may be illustrated as follows:

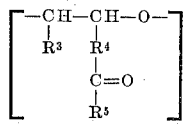

wherein $R^3$ is an alkyl radical and $R^4$ is an alkylene radical with $R^3$ and $R^4$ totaling 8–19 carbons and $R^5$ is an aliphatic alkyl radical of 1–21 carbons.

The cross-linked polymer comprises as the repeating group:

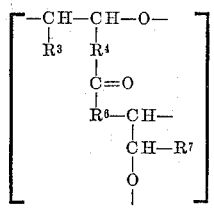

wherein $R^3$ is an alkyl radical and $R^4$ is an alkylene radical with said radicals totaling 8–19 carbons and $R^6$ and $R^7$ are alkyl radicals totaling 8–19 carbons.

The term "linear polymer," as used herein, is intended to mean polymers which are essentially linked through one epoxy group per molecule to form a straight chain polymer of ethylene oxide groups with residual portions of the ketone on the ethylene oxide carbons. Small amounst of the cross-linking, i.e., ethylene oxide bonds between polymer groups due to polyether formation of more than one epoxy group in a molecule, do not appreciably alter the properties of the polymer except to increase viscosity as the amount of cross-linking increases. For purposes of this invention, a linear polymer is one which is soluble in a solvent whereas a cross-linked polymer is a solid not soluble in any solvent and does not melt.

Specific compositions within the scope of the instant invention include diepoxy ketones such as 9, 10, 26, 27, diepoxypentatriacontanone-18 and ketones having one epoxy long chain aliphatic radical similar to the foregoing composition, the other radical being an aliphatic hydrocarbon such as methyl, ethyl, propyl, butyl, etc., up to eicosyl. These compositions include 10, 11 epoxynonadecanone-2, 11, 12 epoxydodecanone-3, etc. up to 9, 10 epoxypentatriacontanone-18 and similar compositions as hereinafter described.

Epoxidation is generally achieved by oxidizing an unsaturated aliphatic ketone. The reaction is carried out at relatively low temperature by any of the conventional epoxidation processes such as the peracetic acid method, the formic acid-hydrogen peroxide method, or the formic acid-hydrogen peroxide method, catalyzed by a small amount of a strong acid such as sulfuric acid, as more particularly described in the copending application of Thomas W. Findley and John L. Ohlson, Serial No. 437,876, filed June 18, 1954, for an invention entitled, "Epoxidation of Higher Aliphatic Materials."

My invention may be further understood from the following examples:

Example I

Two hundred grams of oleone, iodine value 100, was reacted with a mixture of 59 grams of 50% hydrogen peroxide, 5.0 grams of 90% formic acid and 0.6 grams of concentrated sulfuric acid. The mixture was stirred well and the temperature maintained at 40° for 24 hours. The oil was washed with water, then with sodium carbonate solution and then dried. The product, diepoxypentatriacontanone, was a yellow solid at room temperature, contained 4.3% oxirane oxygen and had an iodine value of 7.6.

Example II $\Delta^{10,11}$ - nonadecanone - 2,I.V.90, is epoxidized with a 25% excess of 40% peracetic acid in acetic acid solution at 60° C. for two hours. At the end of this time, the solution is poured into hot water, the product washed with dilute $NaHCO_3$ solution, and finally water. The product, a lightly yellow oil, has an iodine value of 4–6, contains 5.1% oxirane oxygen, and 5.5% carbonyl oxygen. It is soluble in mineral oil and is an effective corrosion inhibitor therein.

Example III 80 grams of myristoleone iodine value 130 was reacted with a mixture of 36 grams of 50% hydrogen peroxide, 3.0 grams of 90% formic acid, and 0.4 gram concentrated sulfuric acid. The reaction was conducted in the presence of benzene as a solvent. The mixture was stirred well and temperature maintained at 40° C. for about 24 hours. After separating the aqueous layer from the oily solvent layer the product was washed with water, then with sodium carbonate solution and dried. The product 5, 6, 22, 23 diepoxyheptacosanone-14 was a solid at room temperature containing 6.9% oxirane oxygen and having an iodine value of 6. The following diepoxy ketones may be prepared in a similar manner to obtain the products indicated:

| Composition | Oxirane Oxygen | Iodine Value |
|---|---|---|
| 3,4,20,21-diepoxytricosanone-12 | 7.7 | 4 |
| 7,8,24,25-diepoxyhentriacontanone-16 | 6.1 | 2 |
| 11,12,28,29-diepoxynonatriacontanone-20 | 5.1 | 6 |
| 9,10,34,35-diepoxytriatetracontanone-22 | 4.3 | 2 |
| 6,7,9,10,26,27,29,30-tetraepoxypentatriacontanone-18* | 10.4 | 8 |
| 3,4,6,7,9,10,26,27,29,30,32,33-hexaepoxypentatriacontanone-18* | 14.5 | 9 |

*In the case of the bis-diethenoic and bis-triethnoic radicals, it is difficult to determine the exact position of the oxirane groups and undoubtedly some diepoxy ketone as well as triepoxy, tetraepoxy, and pentaepoxy compositions are formed.

In general, the compositions will have in the case of the polyunsaturated ketones from 2–6 oxirane groups. Also, in those cases where epoxidation of the ethylene groups is not complete the ketone will have both epoxy groups and ethylene groups although the keto group will be located between oxirane groups. Also, it is necessary if the epoxidation is to proceed satisfactorily and the compositions be suitable for polymerization without ring formation, that at least 5 carbon atoms separate the keto group from the ethenoic group or when epoxidized the oxirane group. Thus, it would not be desirable in the case of the 11-heneicosanone to have the oxirane group any closer than the 6 or 16 position. Polymerization of the oxirane-containing ketones may be effected in any one of several ways such as the formation of polyethers by treating the ketone with a strong Lewis Acid catalyst such as boron trifluoride or forming polyesters by means of treatment with a dibasic acid or a polybasic acid or a polybasic acid anhydride. Suitable polybasic acids include maleic acid, phthalic acid, and tartaric acid, while suitable anhydride curing agents include pyromellitic dianhydride, phthalic anhydride, Nadic anhydride, hexachloro-endo-tetrahydrophthalic anhydride, and combinations of these anhydride curing agents with tertiary amines such as benzyl dimethylamine, triamylamine, etc.

*Example IV*

To 10 grams of 5,6,22,23-diepoxyheptacosanone-14 was added with stirring a solution of 0.2 ml. of boron trifluoride etherate in 1 ml. butyl Cellosolve. Solidification took place in about one minute and a temperature increase was noted. The product is a light yellow transparent solid having moderately pliable characteristics. The cross-linked polymer shows good resistance to melting at high temperatures and is insoluble in alkali and acid. When the same reaction is conducted using only 0.05 ml. of the BF$_3$-etherate catalyst a linear polymer is formed. The linear polymer is a viscous liquid which is soluble in the common organic solvents and in aqueous alkali.

*Example V*

10 grams of the yellow solid prepared in Example I was treated with mixing with 0.15 ml. of BF$_3$-etherate complex dissolved in 4 ml. of ether. The mixture was stirred vigorously and the temperature rose spontaneously to provide a tacky, rubbery, insoluble polymer.

*Example VI*

10 grams of 3,4,6,7,9,10,26,27,29,30,32,33-hexaepoxy pentatriacontanone-18 was mixed vigorously with 1.0 ml. of 2-methoxyethanol containing 0.2 ml. of boron trifluoride ether complex. Solidification took place after a matter of only seconds and the temperature rose. The solid product remaining is a cross-linked, transparent solid with high elasticity.

In carrying out the cross-linking reaction it is advisable to modify the action of the catalyst by complex formation. If stannic chloride or BF$_3$, for example, is added directly to the polyepoxide, local solidification occurs and a coating of the polymer is formed around the catalyst particles.

This results in a decrease of available catalyst minimizing further catalyst activity. Modification of the catalyst by forming the complex is carried out by reacting boron trifluoride with methanol, isopropanol, n-butanol, butyl Cellosolve, and other lower (1–10 carbon) alcohols.

*Example VII*

The preparation of a polyester polymer from the diepoxy ketone involves dissolving 52 grams of a composition prepared in accordance with Example I with 20 grams pyromellitic dianhydride in 200 ml. tetrahydrofuran. The solution is coated on a panel of untreated mild steel and the panel baked in a circulating air oven at 200° C. for two minutes. The resulting coating is clear, tough, flexible, and resistant to solvents.

*Example VIII*

50 grams of 7,8,24,25-hentriacontanone-16 was added to a mixture of 30 grams phthalic anhydride and 1.6 grams benzyldimethylamine at 150° C. The mixture was agitated vigorously and gelled within about three minutes. After curing for about 8 hours at 150° C., a very hard, rigid, transparent resin was produced.

Linear polymers of monoepoxy aliphatic ketones such as that of Example II may be used as viscosity index improvers in lubricating oils.

Obviously, many modifications and variations of the invention as hereinbefore set forth may be made without departing from the spirit and scope thereof, and therefore only such limitations should be imposed as are indicated in the appended claims.

I claim:

1. A symmetrical oxirane-substituted ketone having the general formula,

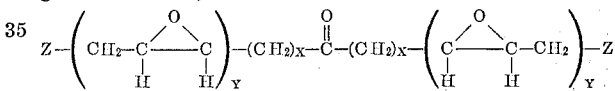

wherein Z is selected from the group consisting of hydrogen and alkyl radicals, X equals at least 5, and Y equals 1–3; said ketone containing a total of 21–43 carbon atoms.

2. 9, 10, 26, 27 diepoxypentatriacontanone-18.

3. A linear polymer preparade from a symmetrical oxirane-substituted ketone of 12–43 carbons, said polymer having as repeating units polyether groups represented by the formula

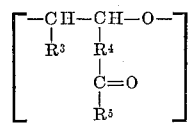

where R$^3$ is an alkyl radical and R$^4$ is an alkylene radical with R$^3$ and R$^4$ totaling 8–19 carbons and R$^5$ is an epoxy substituted alkyl radical of 1–21 carbons, said polymers being prepared by heating said ketone in the presence of a Lewis Acid catalyst until the formation of a fusible, soluble polymer.

4. A cross-linked polymer prepared from a symmetrical oxirane-substituted ketone of 12–43 carbons and having as the repeating group the structure

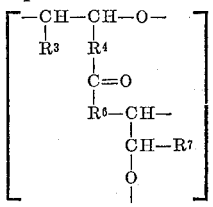

wherein R$^3$ is an alkyl radical and R$^4$ is an alkylene radical with said radicals totaling 8–19 carbons and R$^6$ and R$^7$ are alkyl radicals totaling 8–19 carbons, said polymers being prepared by heating said ketone in the presence of a Lewis Acid catalyst until an infusible, insoluble polymer is formed.

(References on following page)

References Cited by the Examiner

UNITED STATES PATENTS

| | | | |
|---|---|---|---|
| 2,592,560 | 4/1952 | Greenlee | 260—47 |
| 2,692,271 | 10/1954 | Greenspon et al. | 260—348.5 |
| 2,785,185 | 3/1957 | Phillips et al. | 260—348.5 |

OTHER REFERENCES

Nazarov et al., Chemical Abstracts, vol. 47, columns 5367–8, June 10, 1953.

Nazarov et al., Chemical Abstracts, vol. 45, column 8516, October 1951.

Chem. Abstracts, Fifth Decimal Digest, Oleone.

Daniel Swern, Chem. Reviews, vol. 45, pages 17–25, August 1949.

LEON J. BERCOVITZ, *Primary Examiner.*

MILTON STERMAN, HAROLD N. BURSTEIN,
*Examiners.*